(12) United States Patent  
Williams

(10) Patent No.: US 6,223,906 B1
(45) Date of Patent: May 1, 2001

(54) FLOW DIVIDER BOX FOR CONDUCTING DRILLING MUD TO SELECTED DRILLING MUD SEPARATION UNITS

(76) Inventor: J. Terrell Williams, P.O. Box 1821, Lake Charles, LA (US) 70602

( * ) Notice: Subject to any disclaimer, the term of this patent is extended or adjusted under 35 U.S.C. 154(b) by 0 days.

(21) Appl. No.: 09/146,670

(22) Filed: Sep. 3, 1998

Related U.S. Application Data

(60) Provisional application No. 60/060,940, filed on Oct. 3, 1997.

(51) Int. Cl.$^7$ .................................................. B01D 33/04
(52) U.S. Cl. ........................... 210/400; 175/66; 175/206; 209/272
(58) Field of Search .................................. 210/400, 428; 175/66, 206; 209/272

(56) References Cited

U.S. PATENT DOCUMENTS

| | | |
|---|---|---|
| 3,777,405 | 12/1973 | Crawford . |
| 4,378,056 * | 3/1983 | Gay, Jr. .................................. 175/66 |
| 4,493,382 | 1/1985 | Collins et al. . |
| 4,639,258 | 1/1987 | Schellstede et al. . |
| 4,670,139 * | 6/1987 | Spruiell ................................ 210/167 |
| 4,753,633 | 6/1988 | Callegari, Sr. et al. . |
| 4,911,834 * | 3/1990 | Murphy ................................ 210/167 |
| 4,915,850 * | 4/1990 | Onnes .................................. 210/771 |
| 4,940,535 * | 7/1990 | Fisher .................................. 209/250 |
| 5,863,430 * | 1/1999 | Williams .............................. 210/400 |
| 5,919,358 * | 7/1999 | Williams .............................. 210/160 |
| 5,996,387 * | 12/1999 | Williams .............................. 72/111 |
| 6,024,228 * | 2/2000 | Williams .............................. 209/272 |

* cited by examiner

Primary Examiner—Chester T. Barry
(74) Attorney, Agent, or Firm—Finnegan, Henderson, Farabow, Garrett & Dunner, L.L.P.

(57) ABSTRACT

A flow divider box disposed beneath a continuous-loop scalper screen mud separation unit that is driven in a continuous loop conveying and discharging large amounts of drill solids at the end of the separation units end overboard or into a reserve pit. The flow divider box has a box-like housing with an array of openings to redistribute or separate the fluid flow stream, drilling fluid, or drilling mud, in the flow path of the separation unit and selectively supply drilling fluid or drilling mud to a sundry of shale shakers in the process of separating the sediments obtained from a well bore. The flow divider box has a series of collection divider boxes disposed below the separator unit that separate and redistribute drilling fluid or drilling mud, upstream of the conventional solids control equipment of the mud system of a drilling rig. The individual collector boxes are rectangular, baffled, and have adjustable gates parallel to the flow divider box, capable of 2' head capacity. This results in an increased hydrostatic head, which enables high flow rates to be easily processed. The adjustable gates collectively meter the flow rate to the shale shakers or other conventional downstream solids control equipment of the mud system. Thus, one flow divider box services a sundry of shale shakers, etc., while controlling the flow rate at each individual shale shaker. The series of opened or closed gates, or positioned at various increments therebetween, provides the option of running one or multi shale shakers at one time, to compliment the drilling operations, with respect to changes in the lithology, geological formations, or loss of returns in relation to the gallons pumped or volume of drilling fluid or drilling mud entering the flow divider box.

16 Claims, 10 Drawing Sheets

FLOW DIVIDER BOX FOR CONDUCTING DRILLING MUD TO SELECTED DRILLING MUD SEPARATION UNITS

This application claims the benefit of provisional application Ser. No. 60/060,940 filed on Oct. 3, 1997.

BACKGROUND OF THE INVENTION

1. Field of the Invention

The invention relates to a flow divider box embodying a separation unit driving a scalper screen for the removal and separation of sticky shales, heavy clays, or large amounts of drill solids from the drilling mud or drilling fluid in the mud returns circulating out of an oil and gas well bore. A flow divider box with an array of collector boxes containing baffle plates and adjustable gates regulating the fluid flow redistribution of the drilling fluid or drilling mud to independent shakers.

2. Brief Description of the Prior Art

The mud system is an integral part of an oil and gas drilling rig, land or marine. Drilling mud or drilling fluid is continually recycled because of the huge cost factor and for environmental reasons. The drilling mud or drilling fluid is used to hold formation pressures in balance, to create and maintain well bore filter cake, create hydraulic horsepower at the bit, hydrostatic testing, shifting of spherical valve elements downhole, and removal of formation solids, cuttings, sand, etc., through the mud return annulus. As the drilling mud or drilling fluid flows from the bell nipple flow line its solids content is refined and removed, through a series of solids control equipment, each removing or separating the plate-like mica structure to a smaller physical size.

It is of the utmost advantage to remove as much solids as practical to reduce down time resulting from plugged flow lines, fluid end repair, drill string erosion, redrilling of the solids or sediments as the drilling mud or drilling fluid recycles itself through the mud system loop.

The conventional mechanical solids control equipment used for removing solids from drilling mud or drilling fluid involves shale shakers and vibratory screens, desilters, desanders, mud cleaners, and centrifuge. This equipment operates at different levels of particle size rejecting solids and retaining desirable solids which can be part of the drilling mud or drilling fluid additives or chemicals.

The mechanical shale shaker screens are limited to short life, and the screens become coated with sticky clays closing the pores or mesh openings resulting in fluid or mud loss. This adds to the problem as additional water must be added to the drilling mud system. This involves the addition of chemical and mud additives to restore the correct and desired mud properties and mud weight, hence the cost of drilling is increased.

The present invention overcomes the aforementioned drawbacks and disadvantages of the prior art and provides additional advantages as well.

The present invention is installed in the flow path of the drilling mud or drilling fluid in the mud system of a drilling rig, upstream of the conventional solids control equipment, and while drilling virgin or young shales it separates and discharges large amounts of drill solids, gumbo, and heavy clays, from the drilling mud or drilling fluid prior to drilling mud or drilling fluid flowing to the aforementioned conventional solids control equipment.

Now by employing a flow divider box in the drilling mud or drilling fluid flow path line, the sediments are managed through an array of individual collector boxes containing baffle plates and gates that regulate the fluid flow redistribution of the sediments in suspension in the drilling mud or drilling fluid before being individually channeled through cylindrical discharge lines.

The present invention is equipped with manual or hydraulic gates adjustable to complement the drilling program as to gallons per minute pumped, and the drilling fluids program itself. The flow divider box having an array of collector boxes supplies drilling mud or drilling fluid to individual shale shakers, and embodies a removal cartridge type separation unit geometrically installed in the flow divider box, that removes large amounts of drill solids, gumbo, and heavy clays from the drilling mud or drilling fluid upstream of the conventional shale shakers.

SUMMARY OF THE INVENTION

A flow divider box disposed beneath a continuous-loop scalper screen mud separation unit that conveys and discharges large amounts of drill solids at the end of the separation unit serves as first line separation equipment in the flow path of drilling fluid or drilling mud to separate drilled solids and redistribute sediments and drilling fluid and drilling mud to selected shale shakers and other conventional solids control equipment. The flow divider box and mud separation unit is positioned in the fluid flow path of the drilling fluid or drilling mud, upstream of the conventional solids control equipment.

The mud separation unit is removably installed in the flow divider box and is equipped with a wide tensioned mud scalper screen driven in a continuous loop around a toothed drive roller and a rear roller propelled by a motor through a gear reduction box. The separation unit is geometrically positioned on rails a predetermined distance apart on the sides of the flow divider box at an angle less than vertical.

The flow divider box has an attached discharge chute to direct drill solids or gumbo overboard or into a reserve pit, a large cleanout flange parallel with the bottom of the flow divider box for the removal of sediments, and cylindrical discharge flow lines.

The flow divider box contains individual independent collector boxes employing a sliding gate that are adjustably positioned to regulate the fluid flow redistribution of the drilling fluid or drilling mud. The gates allow the drilling fluid or drilling mud to rise to baffle or gauge level, creating a hydrostatic head column at the cylindrical discharge flow lines.

The cylindrical discharge flow lines are of sized diameters and are offset from the bottom centerline of the flow divider box. Full advantage of the volume and hydrostatic head is taken of the drilling fluid or drilling mud to move silt and sediments away from the concave openings of the cylindrical discharge flow lines and the box bottom to optimize the self-cleaning feature.

The flow divider box complements the drilling program as to the number of shale shakers, etc., in operation, gallons per minute pumped, hole size, annular velocity, and the drilling fluids program, as the continuous loop scalper screen moves along the longitudinal axis of the flow divider box redistributing sediments, drilling fluid and drilling mud through an array of autonomous collector boxes, into cylindrical discharge flow lines conveying the sediments, drilling fluid and drilling mud to the downstream solids control equipment, shale shakers, desilters, desanders, etc.

The accompanying drawings, which are incorporated in and constitute a part of this specification, illustrate one embodiment of the present invention and together with the description, serve to explain the principles of the present invention.

PARTS LIST

Figure 1:
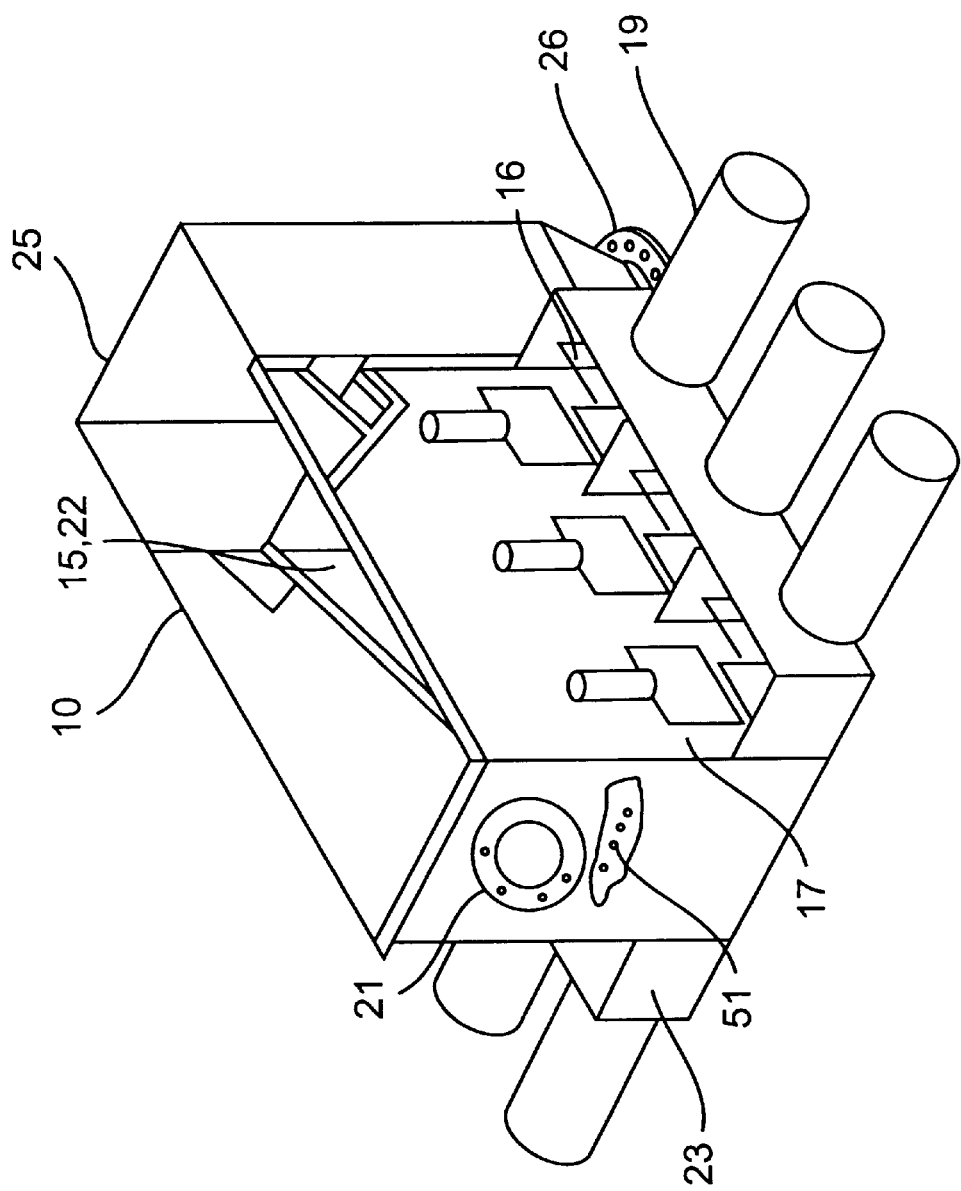
FIG. 1 is an isometric drawing of the flow divider box in accordance with the present invention.

10. Flow divider box
15. Separation unit
16. Baffle plates
17. Gate
18. Clean-out Flange
19. Cylindrical discharge flow line
21. Flow line flange
22. Scalper Screen
23. Collector boxes
24. Rails
25. Discharge chute
26. Discharge flange
27. Outer frame
28. Front tension frame
29. Rear tension frame
30. Placement bars
31. Chain cover bracket
32. Chain wiper
33. Tension system
34. Drive roller
35. Rear roller
36. Hydraulic reservoir
37. Motor-gear reduction box
38. Drive sheave
39. Axle, drive
40. Key
41. Keyway
42. Bearing housing
43. Mesh screen scalper
44. Combination thereof
45. Circular parallel shaft
46. Nut
47. Hydraulic cylinders
48. Air-line
49. Belt
50. Retaining hub
51. Circular parallel shafts
52. Bolts
53. Box cover
54. Axle, rear roller
55. Bolts
56. Plate
57. Plate
58. Motor housing
59. Collar

DETAILED DESCRIPTION OF THE PRESENT INVENTION

As is conventional in the prior art, mixing tanks, holding tanks, flow lines, mud mixers, shale shakers, desilters, desanders, centrifuges are part of an integrated mud system, typical of the downstream solids control equipment on a drilling rig. When drilling in young or virgin shales, a sticky substance known as gumbo is often encountered. The gumbo shale can be of large volume and, because it comprises positive ions, when wet becomes very sticky, impervious and plastic. Thus, it is desirable to separate and discharge the gumbo quickly and efficiently.

The present flow divider box is installed in the flow path of drilling fluid or drilling mud upstream from the conventional solids control equipment and used in connection with a mud separation unit moving a scalper screen installed in the flow path of the drilling mud or drilling fluid to convey, separate, and discharge sticky shales overboard or into a reserve pit prior to it reaching the conventional solids control equipment. The apparatus distributes fluid flow through a sundry of baffled collector boxes and autonomously supplies a plurality of shale shakers, etc., through an array of cylindrical discharge flow lines, simultaneously or selectively as designated by a drilling fluids program.

Referring now to the drawings by numerals of reference, there is shown in FIG. 1, a flow divider box 10 which is installed in the drilling fluids flow path or mud system of an oil and gas drilling rig, lane or marine, upstream from the conventional solids control equipment, such as shale shakers, desilters, desanders, etc. The flow divider box 10 regulates drilling fluid or drilling mud to one or more downstream shale shakers, desilters, desanders, etc., simultaneously increasing or decreasing the fluid flow, independently and selectively through the manipulation of gates 17 disposed within the flow divider box 10. The mud separation unit having a scalper screen 22 is removably mounted at the top of the flow divider box 10 in the flow path of the drilling mud or drilling fluid and serves to remove drilling solids, gumbo, and heavy clays. The mud separation unit 15 and screen 22 are shown schematically in FIGS. 1 and 2, but are described in detail hereinafter with reference to FIGS. 9 and 10. The drilling fluid or drilling mud enters the flow divider box 10 through the flow line flange 21 and is laminated by the circular parallel shafts 51. The drilling fluid, drilling mud, and sediments filter through the scalper screen 22, to be conveyed, separated, and redistributed within the collector boxes 23, via the cylindrical discharge flow lines 19 to downstream shale shakers for the removal of ultra fine silt and sediments, within the drilling fluid and drilling mud circulating out of a well bore.

The flow divider box 10 conveys, separates, or redistributes a continuous fluid flow stream of drilling fluid or drilling mud to autonomous collector boxes 23 arrayed by baffle plates 16 to form individual collector chambers, regulated by gates 17 varying in dimension and profile. The gates 17 are adjustable for predetermined fluid flow rates, changes in fluid flow rates, mud weights, mud properties, viscosity, lithology, and formation change. The cylindrical discharge flow lines 19 are perpendicular to the opposing gates 17. The diameter of the cylindrical discharge flow lines 19 are of predetermined size. The individual cylindrical discharge flow lines 19 are offset at the bottom centerline of the flow divider box 10 in an arrayed collector system of cylindrical discharge flow lines 19 conveying formation cuttings sediments, drilling fluid and drilling mud to the shale shakers, etc., as required.

Figure 2:
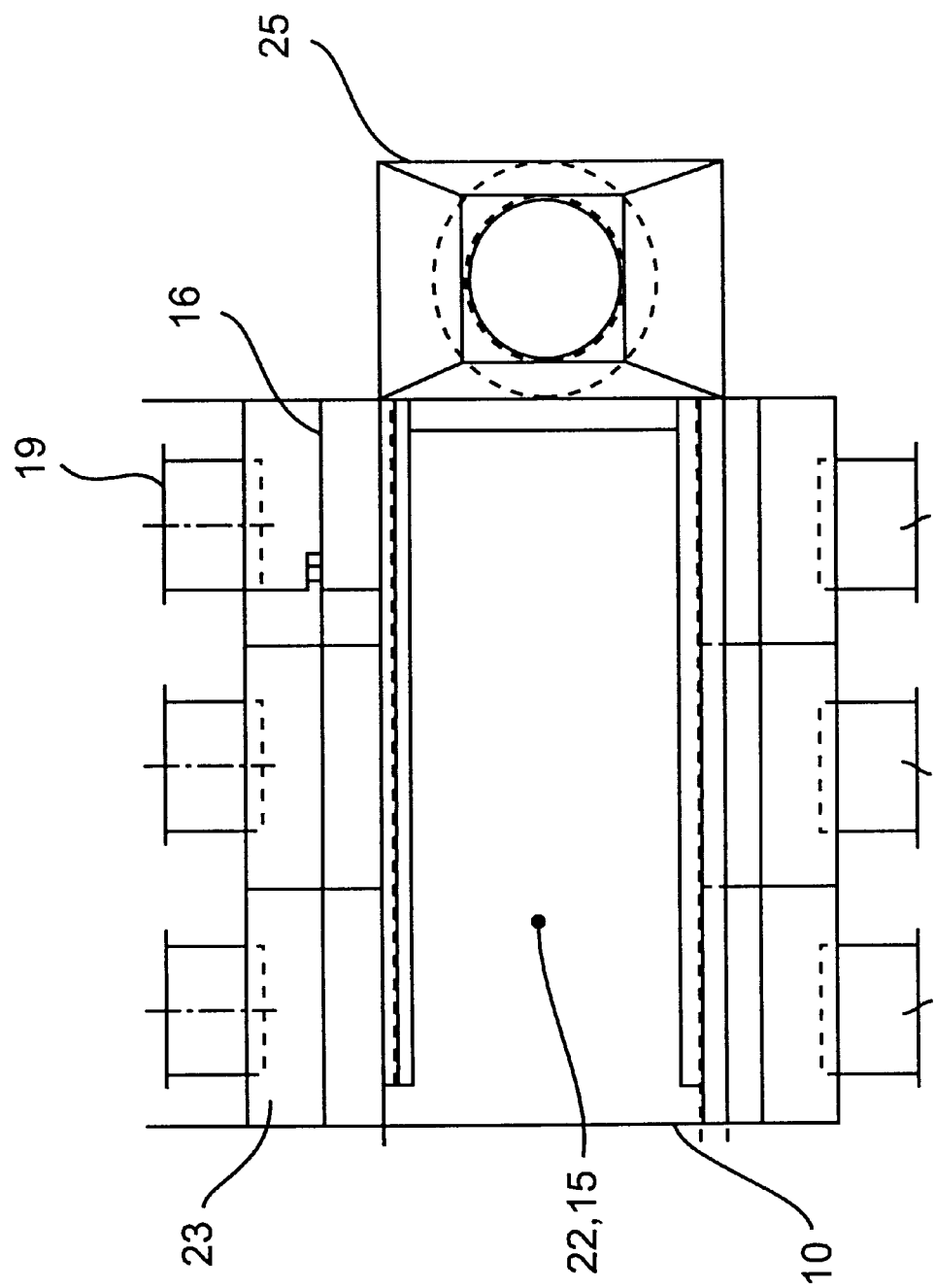
FIG. 2 is a top plan view of the flow divider box.
Figure 3:
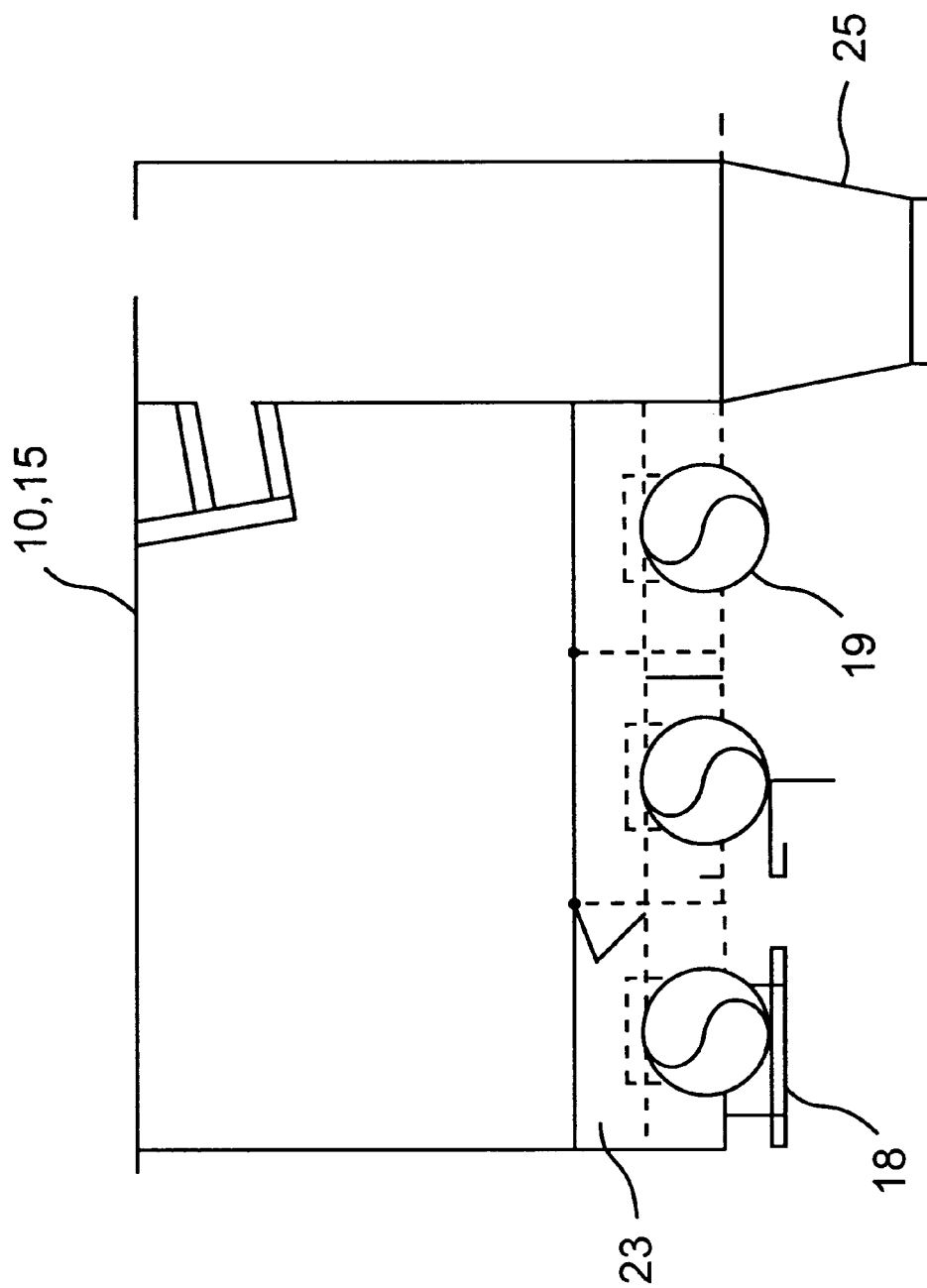
FIG. 3 is a side elevation view of the flow divider box.

FIG. 2 shows schematically in top plan view, the mud separation unit 15 with scalper screen 22 in the flow divider box 10 and the arrangement of the discharge chute 25, collector boxes 23, baffle plates 16, and cylindrical discharge flow lines 19.

As seen in FIGS. 3–8, the continuous loop scalper screen 22 of the mud separation unit 15 discharges large amounts of drill solids off of the discharge end of the flow divider box 10 and separates formation cuttings, sediments, silt, and sand through the openings of the scalper screen 22 while redistributing the aforementioned with drilling fluid or drilling mud to the collector boxes 23 via the cylindrical discharge flow lines 19 to shale shakers, desilters, desanders, mud cleaners, centrifuges or other downstream solids control equipment in the mud system of the drilling rig.

Figure 4:
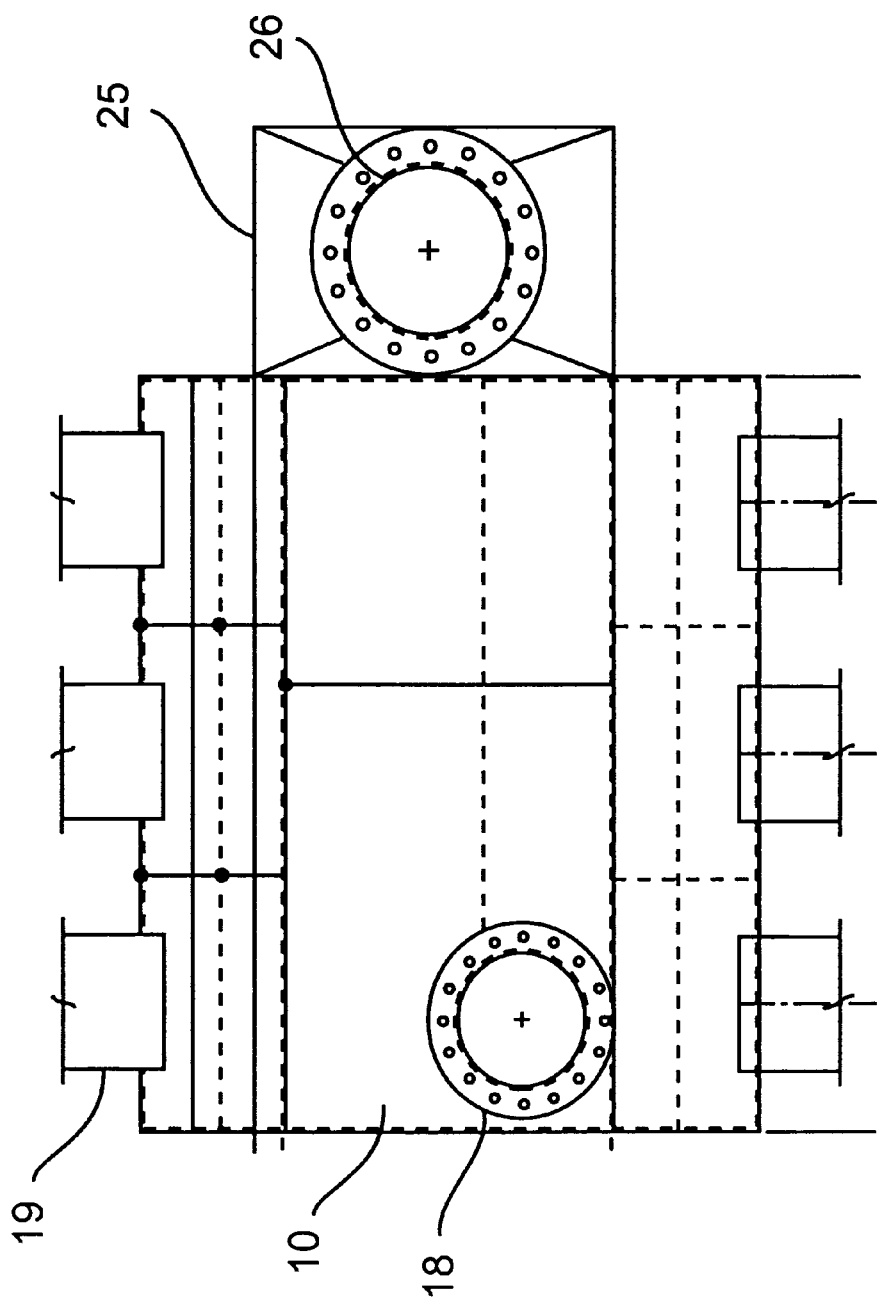
FIG. 4 is a bottom plan view of the flow divider box.

FIG. 4 shows the divider box 10 from the bottom and the arrangement of the opposing cylindrical discharge flow lines 19, the radial discharge flange 26, discharge chute 25, and radial clean-out flange 18.

Figure 5:
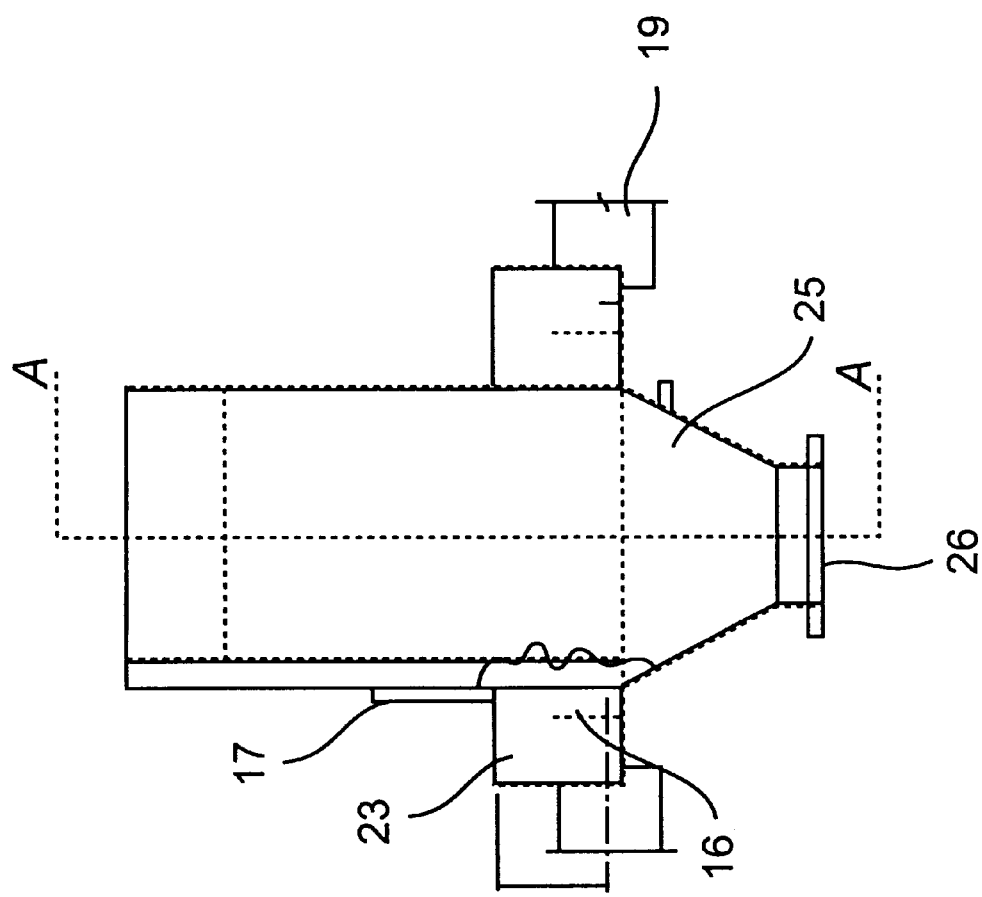
FIG. 5 is an end view of the flow divider box shown partially in cross section.

FIG. 5 shows, in partial cross section, the discharge chute 25 and radial discharge flange 26 that direct the heavy clays, gumbo and other large drill solids overboard or into a reserve pit. The collector boxes 23 and baffle plates 16 provide hydrostatic head end even distribution, or selected distribution by deployment of the gates 17 channeling the drilling fluid or drilling mud via the offset cylindrical discharge flow lines 19, downstream to the shale shakers or other solids control equipment.

Figure 6:
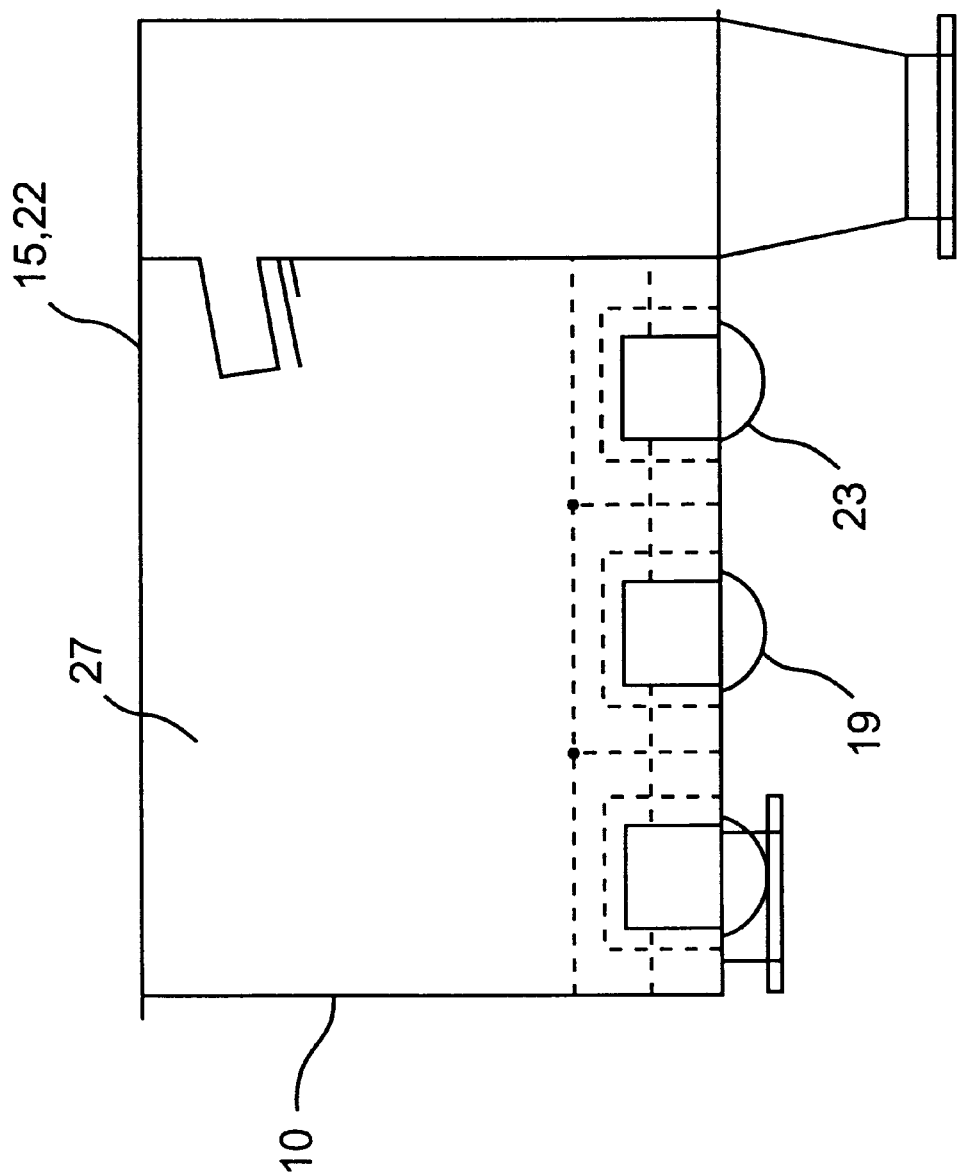
FIG. 6 is a cross section view taken along the line A—A of FIG. 5.

FIG. 6 is a cross section view taken along the fine A—A of FIG. 5, showing the wall 27 of the flow of solids off the separation units end as the continuous loop scalper screen 22 completes its cycle. The collector boxes 23 redistribute sediments, drilling fluid, and drilling mud, through cylindrical discharge flow lines 19 to the shale shakers or other equipment installed downstream as part of the conventional solids control equipment.

Figure 7:
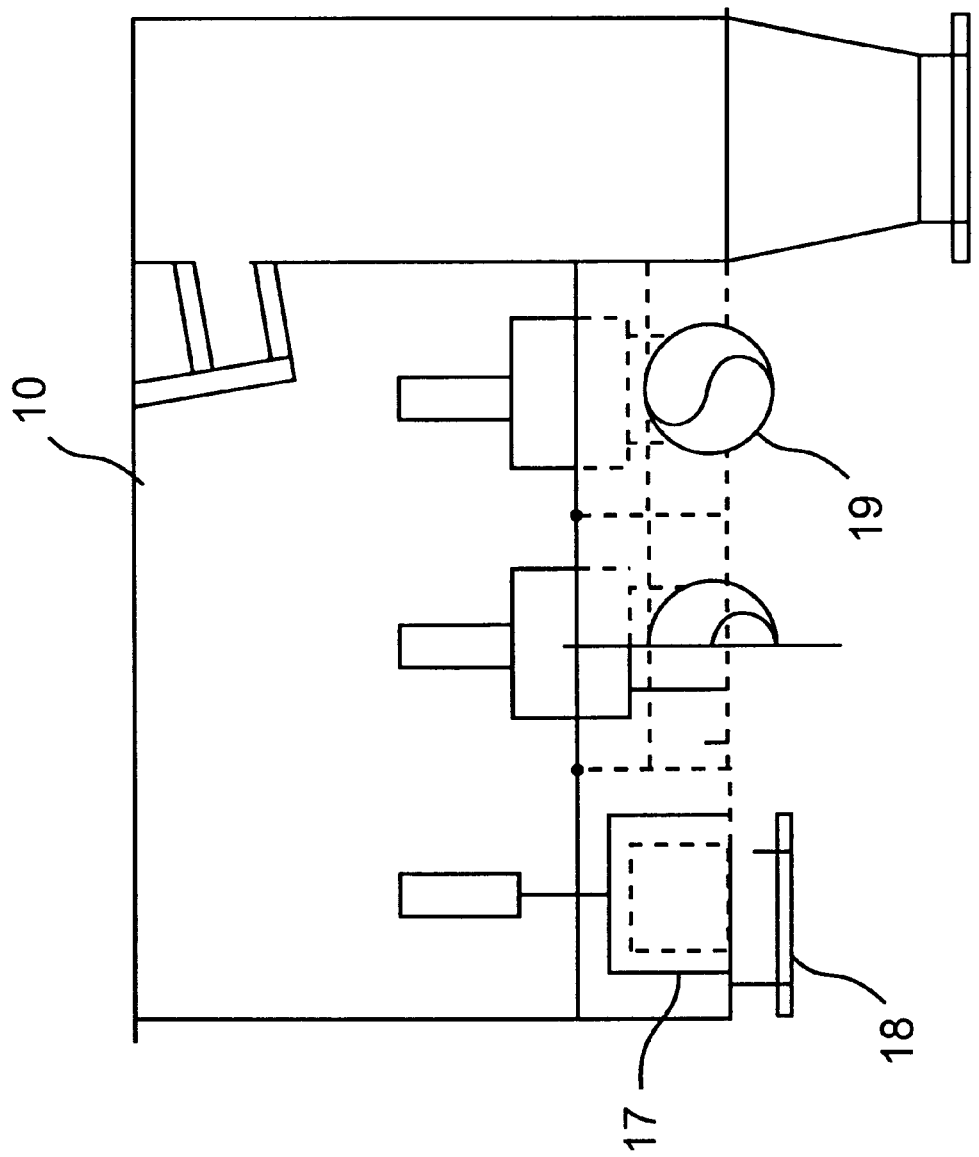
FIG. 7 is a side view of flow divider box showing the gates extended.

FIG. 7 illustrates the positions of the various gates 17. The sliding gates 17 are analogous to a variable choke, whereby the autonomous controlled gate can be open, closed, or be positioned at various increments therebetween. The drilling fluid or drilling mud is conveyed, by sundry ports or individual port via the cylindrical discharge flow lines 19 to the downstream shale shakers, desilter, desander, centrifuge, or other conventional downstream solid control equipment, which are part of the mud system of the oil and gas drilling rig.

During the continuous operational phase of drilling an oil and gas well there can be a build-up of the sediments in solids control equipment. The raised face radial clean out flange 18 is an integral part of the flow divider box 10 and allows for high pressure jetting and easy removal of the silt and sediments.

Figure 8:
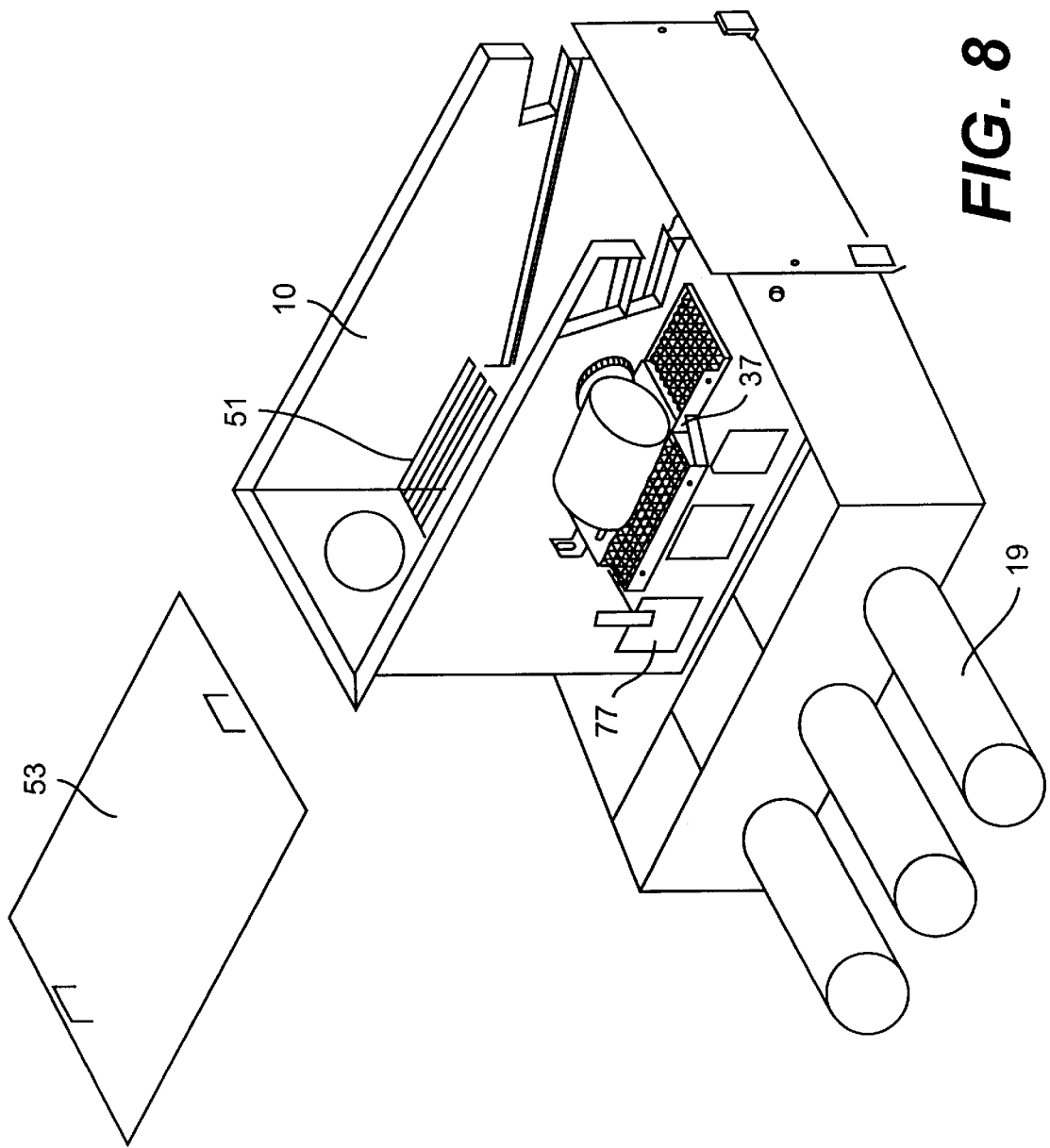
FIG. 8 is an isometric view showing the power source of the flow divider box.

As seen in FIG. 8, the flow divider box 10 has a box cover 53 and an electric motor-gear reduction box 37 mounted parallel to the rectangular flow divider box which is connected to the belt 49 driven, drive sheave 38, and retaining hub 50 coupled to the front axle 39 of the mud separation unit by means of key 40 and keyway 41. The key 40 serves as the mechanical link between the drive sheave 38, retaining hub 50, and the axle 39.

Figure 9:
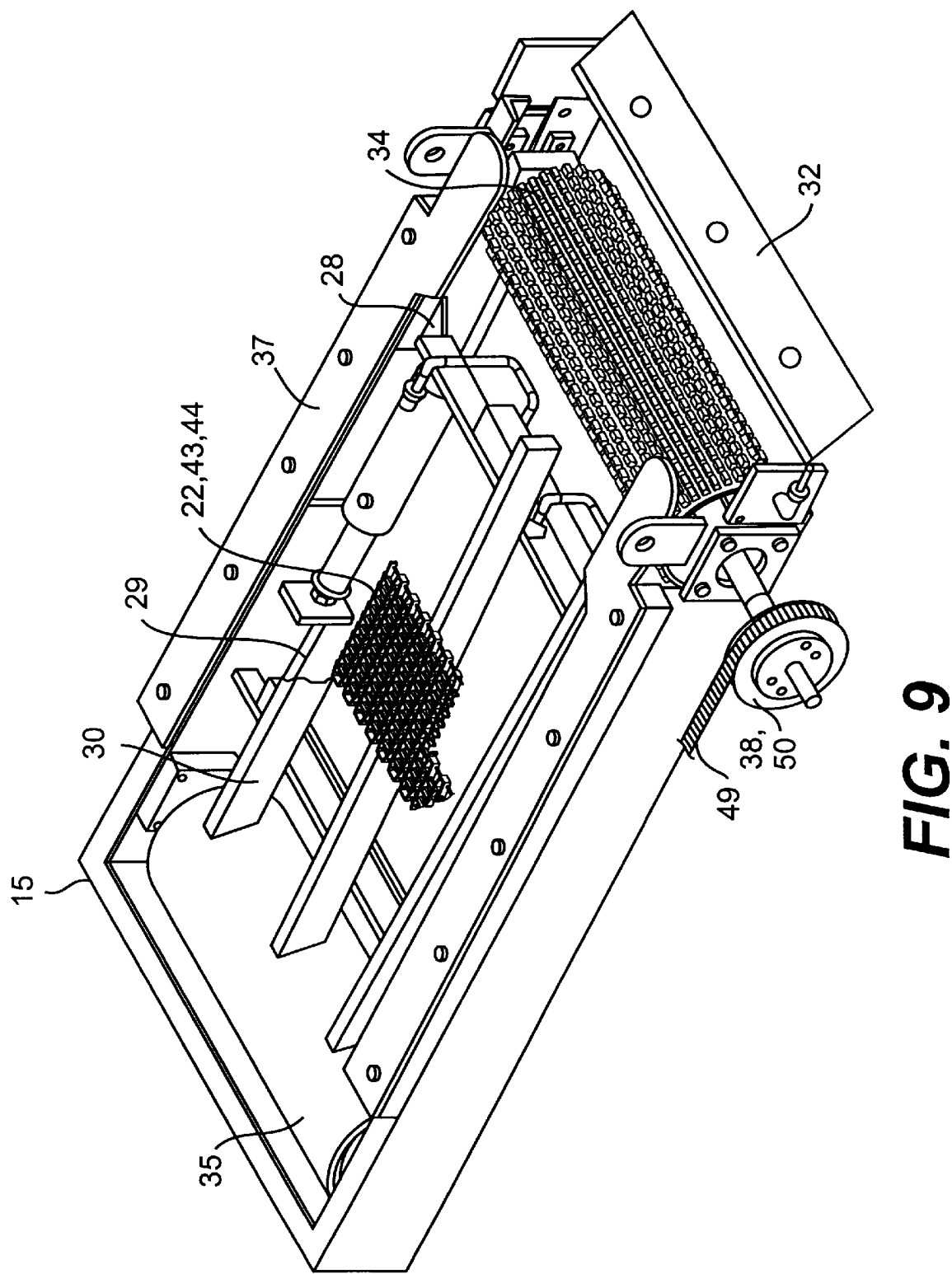
FIG. 9 is an isometric view of the continuous-loop mud separation unit.
Figure 10:
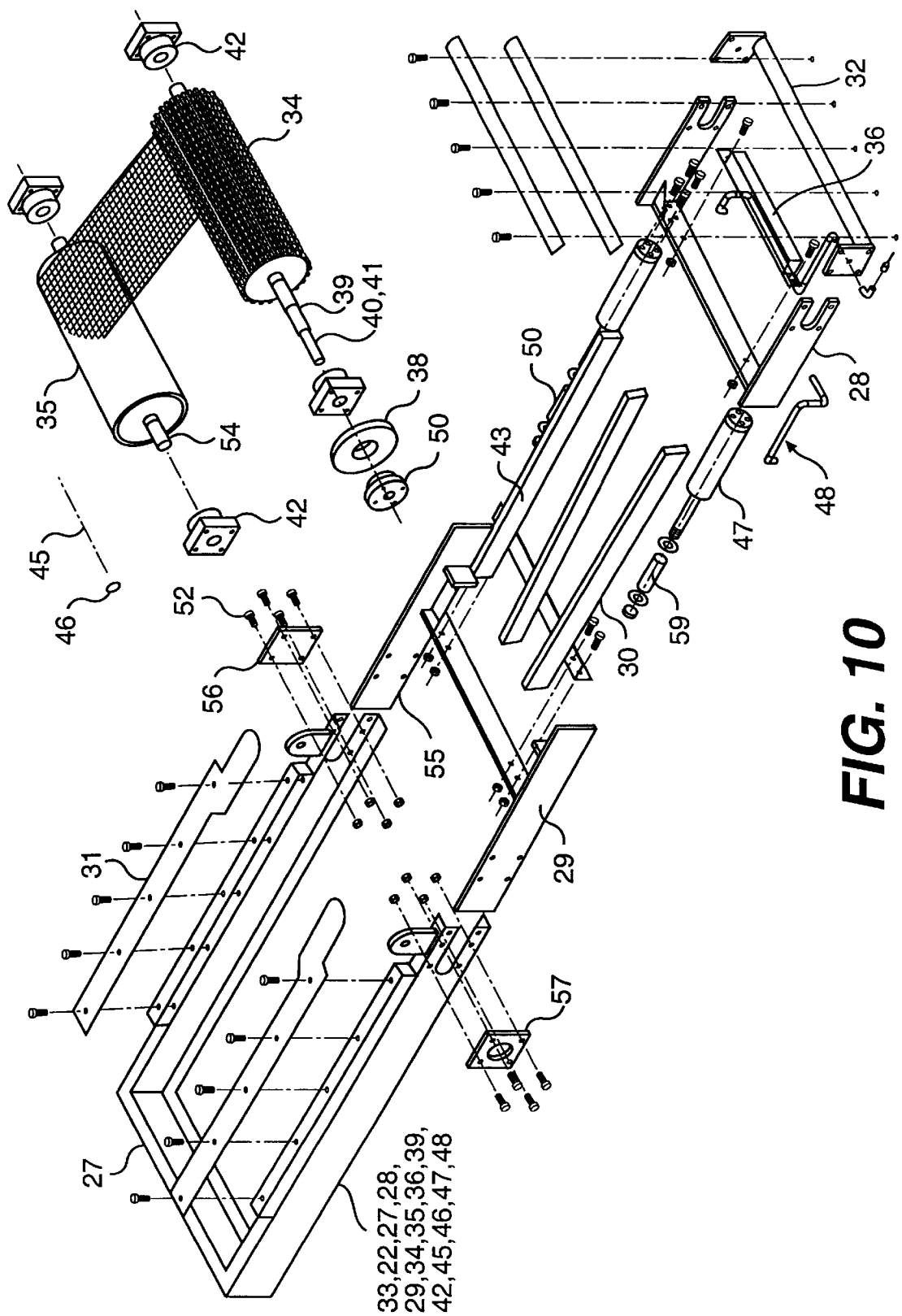
FIG. 10 is an exploded isometric view of the mud separation unit.

Referring now to FIGS. 9 and 10, the mud separation unit 15 includes: an outer frame 27, front tension frame 28, rear tension frame 29, placement bars 30, chain cover bracket 31, chain wiper 32, tensioning system 33, drive roller 34, rear roller 35, hydraulic reservoir 36, motor-gear reduction box 37, drive sheave 38, axle 39, key 40, keyway 41, and bearing housing 42, and drives a wide endless-belt scalper screen 22, mesh screen scalper 43, or combination thereof 44 in a continuous loop. The separation unit 15 has an outer frame 27, front tension frame, rear tension frame 29, tensioning system 33, rear roller 35, and a drive roller 34 having an axle connected with the motor-gear reduction box 37 of the flow divider box to rotate the continuous-loop scalper screen 22 along the longitudinal axis of the outer frame 27. The scalper screen 22 is removably installed by a circular parallel shaft 45, secured by nut 46. The mud separation unit 15 is geometrically supported on inclined rails 24 in the side walls of the flow divider box 10 and disposed in the flow path of the return flow line of the oil and gas drilling rig.

Elements 22, 27, 28, 29, 34, 35, 36, 39, 42, 45, 46, 47, and 48 are components of the tensioning system 33 of the mud separation unit 15.

The mud separation unit 15 serves to convey and discharge gumbo, large drill solids, or heavy clays from the drilling fluid or drilling mud circulating out of the well bore. The scalper screen 22 of the mud separation unit 15, while conveying and discharging solids, reclaims the drilling mud or drilling fluid along with the weight material and chemicals therewithin, by allowing the drilling mud or drilling fluids to pass through the array of openings of the scalper screen thereby reducing mud and chemical cost and reducing logistical problems through reduced mud and chemical usage.

As best seen in FIG. 10, parallel air/oil hydraulic cylinders 47, air line 48, and collar 59 with cylinder rods extended apply and maintain tension to the sliding rear tension frame 29 supporting the rear roller 35. The front tension frame 28 supporting the drive roller 34 on axle 39 extending through journalled bearing housings 42 is affixed to the outer frame 27 by bolts 52. The rear tensioning frame 29 moves independently within the outer frame 27, varying in location to the fixed front tension frame 28, hydraulic reservoir 36, and drive sprocket 34 by extending or retracting the cylinder rods. With the cylinder rods extended, the rear tensioning frame 29 and rear roller 35 traverse to apply and maintain tension on the rotating continuous loop scalper screen 22, mesh screen scalper 43, or combination thereof 44.

The front tension frame 28 supporting the drive roller 34 on axle 39 through bearing housing 42, plate 56, and plate 57 are affixed to the outer frame 27 by bolts 52. The rear roller 35, axle 55, and bearing housing 42 are affixed to the rear tension frame 29 by bolts 55.

The flow divider box 10 embodying the separation unit 15 moves the scalper screen 22 along the longitudinal axis of the flow divider box. The drill solids conveyed on the continuous loop scalper screen 22 are discharged off the end of the separation unit as the moving scalper screen repeats its cycle. The flow divider box 10 separates and redistributes drilling fluid and drilling mud, sustains silt and sediments, and reclaims weight materials and chemicals, and thus minimizes fluid loss and optimizes the mud reclaiming program and operation of the convention upstream solids control equipment.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A flow divider box for separating and distributing drilling fluid and drilling mud to selected solids control equipment, comprising:

means within said box for receiving solids-containing drilling fluid and drilling mud;

means within said box for separating drilling solids therefrom;

said box having a plurality of independent, separate means for regulating and distributing said drilling fluid and drilling mud from said separating means to said selected solids control equipment; and means within said box for separately discharging from said flow divider box said drilling solids separated from said drilling fluid and said drilling mud, with said box being positioned upstream of said solids control equipment.

2. The flow divider box of claim 1, wherein said regulating and distributing means comprises a plurality of independent, separate collector chambers attached to said box, for receiving separated drilling fluid and drilling mud from said separating means and each said separate collector chamber having a separate flow line with each thereof adapted for connection to selected solids control equipment.

3. The flow divider box of claim 2, wherein each said separate collector chamber has separate and independent means for regulating flow of said separated drilling fluid and drilling mud from said separating means through each separate flow line.

4. The flow divider box of claim 3, wherein said flow regulating means comprises an adjustable sliding gate.

5. The flow divider box of claim 4, wherein said separate collector chambers are separated by a plurality of baffles along a bottom portion of said flow divider box.

6. The flow divider box of claim 1, wherein said discharging means comprises a chute attached to said flow divider box and adapted to direct said separated drilling solids out of said flow divider box.

7. The flow divider box of claim 1, wherein said means for separating drilling solids comprises a mud separation apparatus removably installed in said flow divider box.

8. The flow divider box of claim 7, wherein said mud separation apparatus comprises a continuous loop mud scalper screen, a drive roller in driving engagement with said screen and means for driving said drive roller.

9. The flow divider box of claim 8, wherein said drive roller has teeth extending into openings in said screen.

10. The flow divider box of claim 9, wherein said driving means comprises a motor and associated gear reduction box.

11. The flow divider box of claim 7, wherein said mud separation apparatus is removably installed in said flow divider box at an angle less than vertical.

12. The flow divider box of claim 1, wherein means integral with said flow divider box is provided for connection to a means for producing a high pressure jet for cleaning said flow divider box.

13. A flow divider box for separating and distributing drilling fluid and drilling mud to selected solids control equipment, comprising:

an opening in said flow divider box for receiving solids-containing drilling fluid and drilling mud;

a mud separating apparatus removably installed in said flow divider box and positioned to receive said solids-containing drilling fluid and drilling mud from said opening for separating drilling solids therefrom;

a plurality of independent, separate collector chambers attached to said box for receiving separated drilling fluid and drilling mud from said mud separating apparatus, with each of said collector chambers having separate and independent means for regulating flow of said separated drilling fluid and drilling mud through separate flow lines of each of said collector chambers connected to selected solids control equipment; and a chute attached to said flow divider box for directing separated drilling solids out of said flow divider box, with said box being positioned upstream of said solids control equipment.

14. The flow divider box of claim 13, wherein said flow regulating means comprises an adjustable sliding gate.

15. The flow divider box of claim 14, wherein said mud separating apparatus comprises a continuous loop scalper screen, a drive roller in driving engagement with said screen, and means for driving said drive roller.

16. The flow divider of claim 15, wherein said drive roller has teeth extending into openings in said screen.

* * * * *